W. S. ATWOOD.
BRAKE BEAM.
APPLICATION FILED MAR. 13, 1911.
1,036,055.
Patented Aug. 20, 1912.
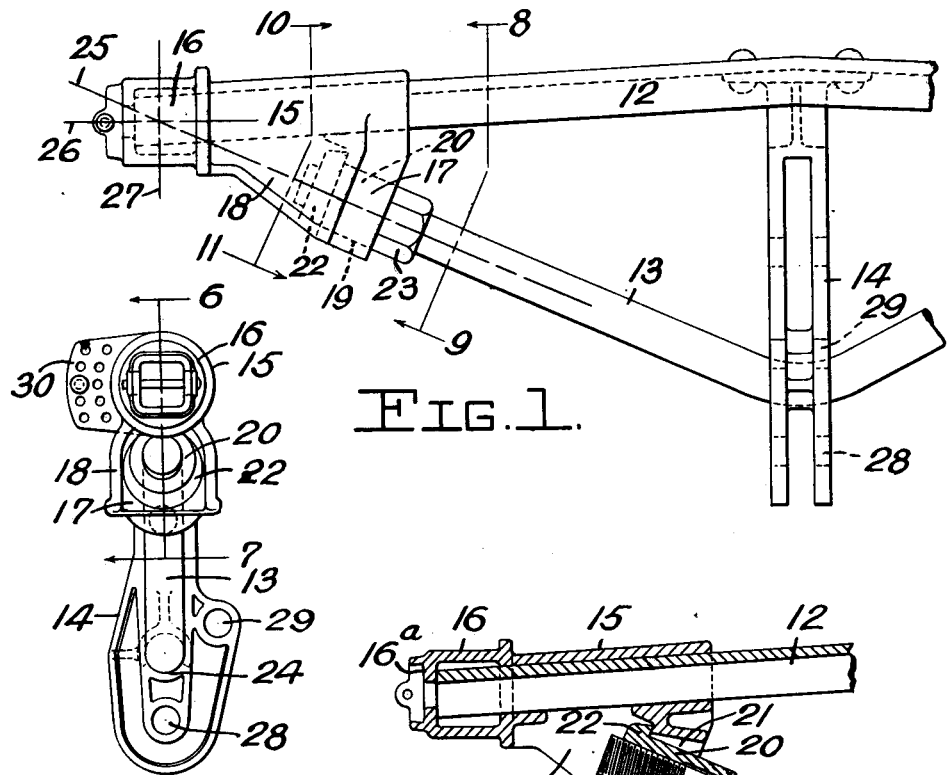
Fig. 1.
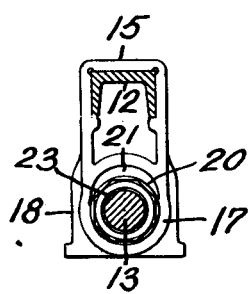
Fig. 2.
Fig. 3.
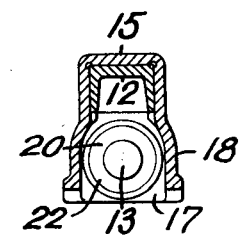
Fig. 4.   Fig. 5.
WITNESSES
INVENTOR
WILLIAM S. ATWOOD,

UNITED STATES PATENT OFFICE.

WILLIAM STEPHEN ATWOOD, OF MONTREAL, QUEBEC, CANADA, ASSIGNOR TO CANADIAN CAR & FOUNDRY COMPANY, LIMITED, OF MONTREAL, CANADA.

BRAKE-BEAM.

1,036,055.  Specification of Letters Patent.  Patented Aug. 20, 1912.

Application filed March 13, 1911. Serial No. 613,983.

*To all whom it may concern:*

Be it known that I, WILLIAM STEPHEN ATWOOD, of the city of Montreal, in the Province of Quebec and Dominion of Canada, have invented certain new and useful Improvements in Brake-Beams, of which the following is a full, clear, and exact description.

This invention relates to improvements in brake beams, and the object is to provide a brake beam having tension and compression members of increased size, without interfering with the fixed dimensions which must be maintained to allow the use of brake beams in standard car trucks.

In the construction of brake beams, the usual method is to provide compression and tension members united at their ends by a sleeve or thrust block to form a very strong truss. The increasing weight and speed of trains have gradually raised the strength requirements of brake beams so that it has become impossible to use the increased size of brake beam on the standard car trucks.

This invention aims to provide a sleeve or thrust block of such design, that the size of compression and tension members may be largely increased, and also to provide a novel method of attaching the tension member to the sleeve.

In the drawings which illustrate my invention,—Figure 1 is a partial plan view of a brake beam. Fig. 2 is an end elevation of same. Fig. 3 is a sectional view of the sleeve on the line 6—7, Fig. 2. Fig. 4 is a transverse section of the beam on the line 8—9, Fig. 1. Fig. 5 is a similar view on the line 10—11, Fig. 1.

In the drawings, 12 designates the compression member, preferably in the form of a channel, 13 the tension member, and 14 the strut separating the two members at the center. A sleeve or thrust block 15 is mounted on the end of the compression member, having the outer end portion 16 thereof made according to the standard fixed dimensions, and provided with an internal flange, 16ᵃ abutting the end of the compression member. On the side of the sleeve adjacent the flanges of the compression member, an offset portion or lug 17 is formed and strengthened by continuing the side members 18 of the sleeve. This lug is apertured at 19 for the passage of a nut 20 screwed on the end of the tension member 13. The aperture 19 is slightly enlarged at 21 on the side adjacent the compression member, to facilitate the insertion or removal of the nut. The nut 20 is cylindrical where it passes through the aperture 19, and is provided at one end with a flange 22 which lies between the plates 18 and bears against the lug 17. The opposite end 23 of this nut, which projects through the lug 17, is polygonal in form for the reception of a wrench or spanner to tighten up the tension member. The aperture 24 in the strut 14 through which the tension member passes is preferably disposed at such a distance from the compression member 12 that the center line 25 of the tension member will pass through the intersection of the center line 26 of the sleeve portion 16, and the center line 27 of the brake head. In this way the stresses occuring in the beam and the application of the force are the same as if the tension member extended entirely through the sleeve in the usual manner. The strut 14 is provided with an aperture 28 for the attachment of the draw bar of the brake and with an aperture 29 for a suspension link. The portion 16 of the sleeve is provided with a perforated member 30, adapted to coöperate with the brake head.

In assembling the parts, one of the sleeves 15 is fitted on the end of the compression member and the tension member passed through the aperture 24 in the strut 14 and through the aperture 19 in the sleeve, the nut 20 being screwed on, and the tension bar and nut thrust into the sleeve as far as they will go. The other sleeve is now applied to the opposite ends of the compression and tension members and the nut screwed on to the end of the tension member. The nuts are screwed up tight on each end of the tension member to draw the sleeves tightly against the ends of the compression member, and the beam is complete.

It will be readily seen that by attaching the compression and tension members to different parts of the sleeves much larger members may be used than have been heretofore possible, resulting in a much stronger and heavier beam, without interfering in any way with the standard fixed dimensions.

Having thus described my invention, what I claim is:—

A brake beam comprising a compression member, a sleeve fitted to each end thereof, having an outer end portion of standard size adapted to receive a brake head, an offset lug at the inner end of each sleeve having an aperture therein, a nut passing through said lug having a collar bearing against the outer side of the lug, and a polygonal portion on the inner side of the lug, and a tension member passing through said nuts, and adapted to be tightened thereby.

In witness whereof I have hereunto set my hand in the presence of two witnesses.

WILLIAM STEPHEN ATWOOD.

Witnesses:
STUART R. W. ALLEN,
E. R. McKENZIE.